Oct. 7, 1969  L. L. BILDUSAS  3,471,357
PROTECTIVE FILM, METHOD OF ADHESIVELY SECURING
IT TO A PAPER BASE AND RESULTING LAMINATE
Filed May 11, 1966
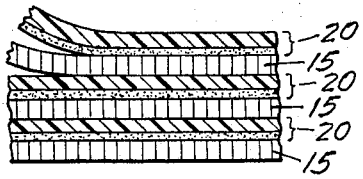
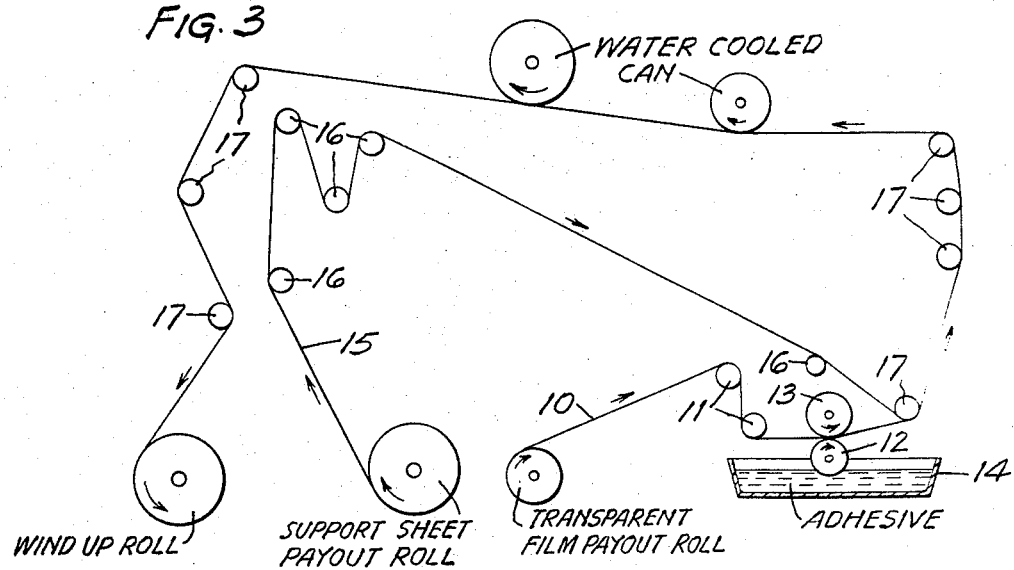
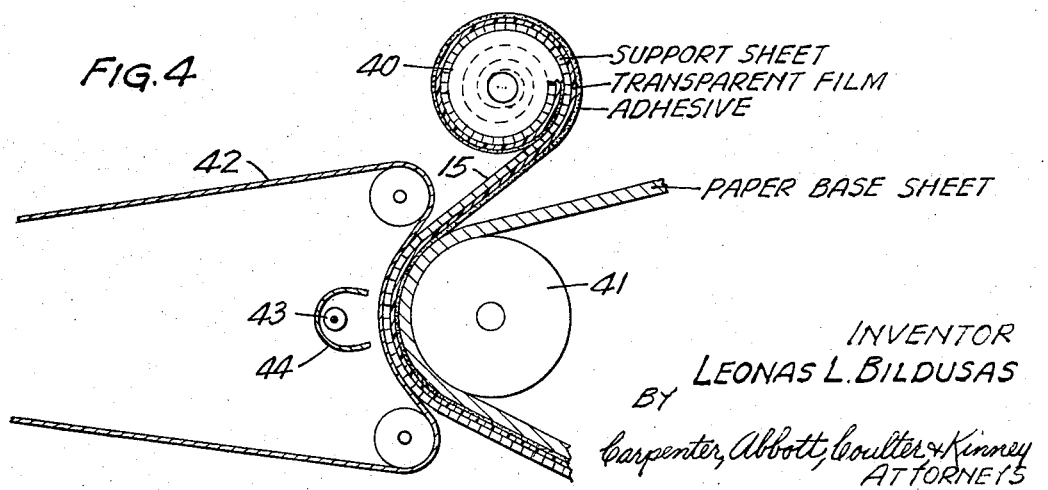
INVENTOR
LEONAS L. BILDUSAS
BY
Carpenter, Abbott, Coulter & Kinney
ATTORNEYS United States Patent Office 3,471,357
Patented Oct. 7, 1969

3,471,357
PROTECTIVE FILM, METHOD OF ADHESIVELY SECURING IT TO A PAPER BASE AND RESULTING LAMINATE
Leonas L. Bildusas, St. Paul, Minn., assignor to Minnesota Mining and Manufacturing Company, St. Paul, Minn., a corporation of Delaware
Continuation-in-part of application Ser. No. 45,998, Jan. 28, 1960. This application May 11, 1966, Ser. No. 554,626
Int. Cl. B32b 27/10, 27/36, 29/00
U.S. Cl. 161—165                                3 Claims

ABSTRACT OF THE DISCLOSURE

The invention is directed to heat sealable protective film comprising polyethylene terephthalate and a special hot-melt-coated adhesive composition of non-tacky characteristic rapidly developing tackiness between 125° F. and 185° F., plus method of laminating that film rapidly to a base paper sheet and the resulting laminate.

---

This application is a continuation-in-part of my application Ser. No. 45,998, filed July 28, 1960.

This invention relates to laminates having an outer protective tear-resistant transparent film covering over a tearable sheet material base, and to a rapid heat-seal process and a protective sheet or film useful in forming such laminates.

The invention is particularly useful in providing tough protective smudge-resistant and tear-resistant transparent cover films over heat-sensitive thermographic papers such as disclosed, for example, in Miller et al. United States Patents Nos. 2,663,654–7. These thermographic copy papers are especially designed so as to undergo a color change when exposed to heat, and have been widely used to make copies of original documents, e.g., typewritten letters, in accordance with the method and apparatus described in Miller Patents Nos. 2,740,895–6, and Khurmeyer et al. Patent No. 2,891,165.

Because of the very heat-sensitive character of these thermographic copy papers, it would not be expected that transparent protective sheets or films could firmly be bonded or laminated to these papers by a thermoplastic adhesive, using heat to activate the adhesive, without causing any color change in the heat-sensitive thermographic papers themselves. This invention, however, provides a solution to this problem, as well as a new heat-sealable transparent protective sheet or film and a process for laminating such film to underlying paper sheet materials, regardless of whether the underlying sheet material is of heat-sensitive thermographic character or not.

The protective film of this invention is firmly bonded to the underlying paper base sheet so that it resists delamination at temperatures as high as, or even slightly higher than, those needed for initial activation of the thermoplastic adhesive for bonding. The laminates hereof are flexible and permit handling in the same manner as an ordinary sheet of paper; but advantageously, the thin protective transparent cover film prevents tearing and smudging of the underlying paper in the laminate without obscuring any markings thereon. Where the underlying paper is an original document containing markings to be preserved without alteration, the protective cover film of the laminate, firmly bonded to the underlying document as it is, serves the additional purpose of making it impossible to alter the markings of the underlying document by using writing instruments such as pencils or pens. Of course, where the underlying paper base is a heat-sensitive thermographic paper such as noted above, additional markings may be placed thereon by the method referred to in the aforenoted patents, or existing markings may be obliterated by causing a heat-triggered color change throughout an area of the heat-sensitive sheet. Such is sometimes an advantageous feature where an authorized alteration is desired without going through the cumbersome procedure of making an entirely new document.

Insofar as is known, no one heretofore has provided the art with a transparent tear-resistant protective heat-sealable cover film of such character as to be handleable to give smoothly-laminated and firmly bonded protective covers over thermographic papers by techniques such as those involving the use of radiant energy, or by any other technique for that matter. The transparent protective films of this invention, however, are conveniently laminated over heat-sensitive thermographic copy papers using radiant energy as a primary heat source, and yet no color change is caused in the heat-sensitive paper by my process of lamination.

While transparent heat-sealable films are well known as a general class, those heretofore available have either distorted badly during attempts at heat lamination to heat-sensitive thermographic papers, or have caused the thermographic papers to change in color under the conditions needed for heat lamination, or have given poor bonds of nonreliable character using the process hereof, etc. For example, cellulose acetate coated with a heat-sealable rubber-wax adhesive is a known commercial product; but attempts to seal that commercially available film to graphic originals or thermographic copies using a radiant heat source result in a poor bond, or distortion and wrinkling of the acetate film or the underlying sheet material. Films consisting of polyester backings coated with heat-sealable polyethylene are also known; and these commercially available films have likewise been impossible to use as one obtains either a poor bond in processing or a complete destruction of the heat-sensitive thermographic paper. In short, insofar as is known, there has been no protective transparent heat-sealable film heretofore available that has given successful laminates to heat-sensitive thermographic papers in a process using a radiant energy heat source removed from contact with the sheet materials to be laminated.

The protective heat-sealable films of this invention are so extraordinarily thin and lacking in body that they are, from a practical standpoint, marketed with disposable flexible support or separator sheets in association therewith for the purpose, inter alia, of lending body to the composite of support and protective film, as well as to aid in permitting easy removal of a single coated film from a stack thereof. Indeed, the preferred embodiment of my cover film is so flimsy that it folds easily or quickly as a result of air currents when one lifts the film alone from a table using two fingers along one edge of the film. Nevertheless, this cover film lies flat when placed over a base sheet for lamination, and is conveniently laminated to that base sheet using radiant energy and only slight pressure, as by passing the composite with an absorber between a belt and guide roller; and this is accomplished without wrinkling or distortion or burning of the film. Under the conditions of lamination, the cover film not only lies flat, but remains dimensionally stable. It is conveniently handled to gain improved laminates having the protective film firmly bonded as a part thereof.

However, an especially desirable product of the invention, for use particularly in reinforcing applications (at the edge of paper for holding in a ring binder), is a tape product which indeed consists essentially of a transparent heat-sealable film, as described, wound upon itself in a roll without an interliner (preferably with the heat-sealable coating innermost).

Even though the adhesive coated cover films hereof are marketed preferably with support or separator sheets therebetween, they are non-blocking at temperatures up to about 125° F. and thus, aside from convenience of handling, could be marketed without separator sheets. In combination with this non-blocking property, these films are rapidly activatible to high tack within the low temperature range of about 125° F. to 185° F.

The invention will now more particularly be described with the aid of a drawing, made a part hereof, wherein:

FIGURE 1 is a schematic magnification cross-sectional view of a lamination prepared according to the invention;

FIGURE 2 is a schematic magnified cross-sectional view of the essential features of one type of package for my heat-sealable transparent protective covering film;

FIGURE 3 is a schematic view, in the nature of a flow sheet, illustrating a process of making my transparent film; and FIGURE 4 is a schematic cross-sectional view illustrating essential elements of apparatus and arrangement of materials for the process of lamination according to my invention.

For convenience, many elements and parts of the drawing are labeled thereon in brief terms so as to provide a basis for general comprehension without reference to this specification. However, it is to be understood that the general understanding of the invention gained from a glance at the drawing is not to substitute for the complete disclosure herein.

The laminate of FIGURE 1, for example, may include additional layers, and preferably does include an additional, almost non-detectable layer, i.e., a primer between the transparent film and the adhesive. This primer may be somewhat discontinuous as a coating, but serves the purpose of improving the permanency of anchorage or affixation of the adhesive layer to the transparent film.

Also, the paper base sheet of FIGURE 1 may in fact include several layers (as in the case of heat-sensitive thermographic copy sheets), only some of which are cellulosic as paper is; or it may be a composition of cellulosic material and other organic or inorganic materials, thus likewise satisfying the characterization of being a "paper" sheet. Many sheet materials known to be light-sensitive satisfy this paper characterization, both before and after exposure. Characteristically, the paper base sheet is one that is torn so easily that its tearing quality becomes a problem where it is to be subjected to strains in use, or to heavy and frequent use, as in a manual for salesmen.

The paper base sheet protected as taught herein generally will contain markings thereon such as a typewritten message, a graph or chart, a picture, a map, etc. However, where, for example, heat-sensitive papers are to be protected, lamination of a transparent protective sheet thereover may be accomplished before exposure of the paper to effect a heat-triggered color change, provided that the adhesive coating and other portions of the transparent sheet or film contain no chemicals available for reaction with the heat-sensitive sheet to neutralize its heat-sensitive character.

As illustrated in FIGURE 2, and by the payout roll 40 of FIGURE 4, the transparent protective heat-sealable cover film 20 (i.e., the adhesive coated transparent film) of the invention is preferably supplied to users with a support sheet 15 in non-adherent delaminable association therewith. A suitable support sheet is one having the thickness and character of onion skin typing paper, although thicker sheets may serve adequately as support or separator sheets. Without separator sheets, it would be extraordinarily inconvenient, from a practical standpoint, to separate discrete single coated films from the remainder in any reasonably convenient manner. Since a radiant energy absorber is required in association with sheet materials to be laminated according to the process taught herein, it is sometimes desirable to employ support sheets which themselves have at least some ability to absorb radiation. Thin kraft paper or grey paper support sheets serve effectively for this purpose; but carbon impregnated paper sheets or sheets dyed or toned with infra-red absorbers are also useful.

The support sheet also serves as an effective aid in manufacturing the heat-sealable protective film hereof. It serves as a back-up sheet or web relieving the transparent film from distorting forces of tension during manufacture of the adhesive coated film structure. Referring to FIGURE 3 for illustration, a transparent film 10 to be coated with heat-sealable adhesive is drawn from a payout roll about guide rolls 11, and then passed between coating rolls 12 and 13 above a bath of adhesive in trough 14. Coating rolls 12 and 13 rotate as illustrated in the drawing and are tight together so that they serve, to some extent, to pull film 10 therebetween. Simultaneously, adhesive from trough 14 is picked up by roll 12, which rotates in the bath of adhesive; and a very thin film of adhesive, which may be continuous or discontinuous, is deposited on film 10. While the foregoing takes place, a support sheet or back-up sheet in the form of a sheet of paper 15 of width equal to the transparent film is also drawn from a payout roll, and after passing over guide rolls 16, is placed in non-adherent laminated relationship behind the transparent film 10. Although FIGURE 3 illustrates applying the back-up sheet of paper 15 behind the transparent film 10 after the coating step, it will be understood that forming of the loose laminate here described may be accomplished prior to applying adhesive to the transparent film 10. The loose laminate is pulled through the apparatus along a route established by guide rollers 17 and cooling cans rotating over the adhesive coating, with the support sheet or back-up sheet serving to relieve the transparent film from most of the tension of pulling. After the adhesive coated free or open side of the transparent film has cooled, the loose laminate is suitably wound directly on a wind-up roll to form a roll-type article, as illustrated in further detail at 40 in FIGURE 4. The power used to roll the coated stock on the wind-up roll is suitably relied upon to pull the loose laminate through the apparatus illustrated in FIGURE 3. From the coated stock roll, the material may be unwound and cut to size for stacking as illustrated in FIGURE 2, or the roll-type article itself may be used as a payout roll for automatic lamination of the transparent film to printed document papers, thermographic papers, etc., as illustrated in FIGURE 4. It will be evident from the foregoing that support or separator sheets of non-stretchy or non-extensible type are important to use, particularly in all cases where the transparent film itself is of such character as to be stretched when pulled alone through elements of apparatus.

The preferred heat-sealable protective transparent films of the invention are those having a transparent polyester, or equivalent, film backing of up to about 1 mil thickness. Films as thin as .3 mil or even .2 mil are adequate, and films as thick as about 2 or 3 mils will give reasonably satisfactory results, though not without loss of some desired flexibility for protectively covered papers. Films up to about 1 mil thickness cause little change in flexibility for the end laminate, and yet impart the necessary tear resistance and smudge protection required. Also, the thinner films are advantageous from the standpoint of their reduced mass, which makes for more rapid conduct of the process of lamination since less heat is wasted in the mass of the transparent film.

Where a thermoplastic coating is to be applied to a transparent film using a hot-melt coating procedure, it is imperative that transparent films be employed which do not melt away at the temperature of adhesive application. Polyester films such as polyethylene terephthalate ("Mylar") satisfy this requirement, and in addition possess several other advantages. They have heat distortion points well in excess of 200° F. They do not become discolored or embrittled on aging; and thus they provide protection for long periods as is required. They are resistant to tearing or wrinkling, resistant to attack by oils and grease, as well as most common organic solvents, e.g., acetone, carbon tetrachloride, heptane, etc. Also, they are resistant to degradation on exposure to water and stand up well in the laminates hereof when repeatedly handled and thereby coated with skin oils, moisture, etc. Even solutions of acids such as sulfuric and alkalis such as sodium hydroxide cause essentially no noticeable degradation of such films, particularly when they are wided clean within a reasonably short time after contamination.

Significant requirements of the transparent film are that it remain flexible and not embrittle or degrade so as to be easily torn or cracked after a short period of exposure to sun or the like in use. Also, the material of the transparent film in the thicknesses employed should preferably be very low in its absorptivity of radiant energy, or non-absorptive of such energy. Of course, instead of polyethylene terephthalate film, equivalent transparent films may be used. Where protective films having heat-distortion points near activation temperatures for the adhesive coating are employed, extra care is necessary to prevent wrinkling or warpage during lamination; thus distortion points above about 200° F. for the protective films are greatly preferred. Polyethylene terephthalate-type films, suitably primed, are practical for realistic maximum toughness, heat stability, resistance to embrittling, longevity and for the other benefits of the invention.

The transparent protective cover film of the invention resists sticking of materials to it, but yet sticks well itself to an underlying substrate as part of the end laminate. It is coated according to the invention with a thermoplastic adhesive composition which itself exhibits a specific adhesion to the film or which is anchored thereto through the intermediary of a primer adhesive coating, the latter being firmly anchored to the film backing.

The thermoplastic adhesive rapidly develops tackiness within a limited, rather low, temperature range, and yet remains non-tacky and non-blocking at temperatures up to about 125° F. Its activation occurs at a rather sharp temperature or narrow temperature range within the broader range of 125° F. to about 185° F., preferably between 125° F. and 160° F., in order for effective and rapid conduct of the process of lamination disclosed herein, as well as in order to gain firmly bonded laminates essentially immediately on emergence from the laminating apparatus. A wide variety of adhesives may be employed to achieve this result. Preferred adhesive compositions, however, are blends of wax-like or crystalline organic materials of sharp melting point together with one or more plasticized non-rubbery film-forming polymeric resins. The adhesive is coated to provide an extremely thin layer, e.g., coating weights as low as 1.5 pounds per 144 square yards up to about 3 pounds per 144 square yards are used. Greater coating weights create difficulties in lamination such as wrinkles and bleeding of adhesive at edges, and further involve unnecessarily large amounts of materials. Also, greater coating weights result in increased mass to heat, and cause a decrease in the definition of characters formed by heat copying when the step of heat copying is accomplished after laminating the protective film hereof to an underlying thermographic paper.

The ingredients of the adhesive system are optically compatible with each other in that they, after heat activation to tackiness and application to a paper in the process of lamination described herein, form a mass which is transparent under the conditions of use. However, prior to activation, or under different conditions of viewing than those employed here, the adhesive coating may possibly be non-transparent or even opaque.

Liquid plasticizers in the adhesive layer are useful to impart flexibility to laminated products of the invention, particularly in those cases where high melting polymeric resin materials of a tough or somewhat brittle character are employed. They also, in combination with the wax-like or crystalline organic component, serve to alter the end properties of the composite adhesive mass so that it exhibits high tackiness within the limited low temperature range of 125–185° F., even though the non-rubbery polymeric resin employed may alone not even be softened at such temperatures. Where a crystalline component melting below 185° F., preferably below 160° F., is selected for its high plasticizing action on the chosen polymeric resin (e.g., where diphenyl phthalate is used), or where the polymeric resin is especially tailored so as to include a plasticizing ingredient within its molecules, and in effect therefore is internally plasticized, the liquid plasticizer may be reduced substantially or even eliminated. But where high melting crystalline plasticizers are used, a liquid plasticizer advantageously is used to depress the recrystallization of the crystalline plasticizer.

It is noteworthy that the waxy or crystalline component need not, as such, melt at temperatures below 160° F. or even 185° F. to be useful in the adhesive composition. It may melt at temperatures as high as about 200° F., or even higher. However, crystalline ingredients such as, for example, diphenyl phthalate (melting at about 156° F.), or wax-like materials such as paraffins, melting at lower temperatures, even as low as 125° F. are useful. Waxes melting above 185° F. should preferably be accompanied by a room-temperature-liquid plasticizer or a plasticizer melting at least below 185° F. Eutectic mixtures are possible, but reliance need not be placed upon a true eutectic to gain the necessary adhesive properties.

The preferred film-forming polymeric resins to employ have rather bulky molecules which, it appears, serve to improve strength of bond in a finished laminate. Illustrative ones are polyvinyl butyral, polyvinyl acetate, ethyl cellulose, etc. They characteristically have a melting point or liquidation temperature well above 160° F. or even 185° F., and even may not soften below 185° F.

Special optional ingredients designed to impart particular properties such as specific adhesion may also be included in the adhesive formula; the use of a chlorinated terphenyl resin in the formula below to improve the anchorage of the thermoplastic adhesive coating to the primed polyethylene terephthalate backing is illustrative. Advantageously, it also tends to lower the softening point of the polyvinyl butyral resin and serves as an auxiliary tackifier as well as toughening agent; but the slight improvements thereby imparted to the adhesive are not essential.

As a specific illustration of a heat-sealable transparent film suitable for lamination in accordance with the principles of the invention, as well as a method for making the same, the following is offered: A 0.6 mil thick sheet of biaxially-oriented polyethylene terephthalate ("Mylar") and a back-up sheet of onion-skin thin kraft paper are threaded through apparatus as illustrated in FIGURE 3. The "Mylar" is previously coated on one side at about 1 to 5 microns thickness with a well-anchored primer adhesive layer such as, for example, a copolymer of vinylidene chloride, an acrylic ester and itaconic acid, or a layer of polyisocyanate or polyisothiocyanate (see U.S. Patent No. 2,698,242), or by other means, any of several methods and materials, as is generally understood in the art, being satisfactory to employ for priming. The primed film is, of course, placed in the coating apparatus so that its primed side is in position for receiving adhesive from the trough 14.

Over the primed surface of the film is coated a water-insoluble adhesive composition consisting of, in parts by weight: 4 parts of polyvinyl butyral resin ("Butvar B–76–1"); 6 parts of a room-temperature-liquid aryl phosphate, specifically 2-biphenyl diphenyl phosphate, as protective film, or excessive flow of the heat softened coating.

If desired, the apparatus for lamination may be modified, for example, by employing a belt 42 which itself is sufficiently absorptive of radiant energy to become heated by absorption from source 43, and thus effect heat concentration at the area of the laminate contacting the belt during lamination. Such modification may obviate the need for passing an adsorber support sheet through the apparatus during lamination. The absorber employed is preferably very thin so as to have a low mass permitting conservation of energy. As a further modification, radiation absorptivity built into materials of the laminate itself (e.g., the adhesive, or the underlying paper base) may be relied upon for heat sealing as taught herein.

The protective heat-sealable film of the invention may be applied to both sides of a paper base sheet, if desired. It serves not only to protect documents against dirtying, smudging, tearing, etc., but enhances eye appeal. It strengthens papers having tears, cuts, holes, creases or other weak points. Illustrative uses include lamination of the protective film over documents such as price lists, sales literature, photographs, bills of lading, newspaper clippings, birth certificates, maps, graphs, labels, etc., whether the document is an original or a copy on heat-sensitive thermographic paper.

Rapid application (e.g., 3 inches or more per second, as aforediscussed) of the heat-sealable films of this invention introduces an entirely new dimension to the practice of applying protective films on tearable or damageable paper base sheets. It will be noted that no solvents are employed. No water is needed; and the problems of solvent evaporation are avoided. The process is so swift and simple and convenient and neat or non-messy that it for the first time presents a practical office laminating technique not requiring skilled personnel to accomplish the feat.

The foregoing is to be considered illustrative of my invention, as the same is further set forth and defined in the claims appended hereto.

That which is claimed is:

1. In a laminate of the type wherein a biaxially oriented film of polyethylene terephthalate is securely affixed to paper by an adhesive, the improvement which comprises employing as the adhesive:

a thin layer, about 0.2 to 0.4 mil thick, of a thermoplastic, transparent, hot-melt, nonrubbery composition essentially containing a thermoplastic polymer selected from the class consisting of vinyl butyral and vinyl acetate polymers, and characterized by being nontacky and nonblocking at temperatures below 125° F., being tackifiable within 3 seconds at 140°–185° F., having a sharp melting point below 185° F., being nonreactive with the chemicals in thermographic heat-sensitive paper, and being able to quickly form strong bonds to paper and polyethylene terephthalate resin with only slight pressure.

2. A biaxially oriented polyethylene terephthalate film having a thin layer, about 0.2 to 0.4 mil thick, of adhesive securely affixed to one side thereof, the improvement wherein the adhesive consists essentially of a uniform blend of the following components, all parts being by weight:

4 parts of polyvinyl butyral resin having a ball and ring softening temperature of about 395° F., 6 parts of synthetic wax-like hydrogenated castor oil having a melting point of about 185° F., 6 parts of room temperature liquid 2-biphenyl diphenyl phosphate plasticizer, and 2 parts of transparent chlorinated terphenyl resin having approximately 60% chlorination by weight and a softening point of about 212–222° F.

3. A method of protecting a paper base sheet against tearing and smudging, comprising (1) overlaying a flexible tough transparent heat-sealable film structure upon said paper base sheet, the said heat-sealable film structure comprising a backing of a flexible tough transparent tear-resistant polyester film of polyethylene terephthalate no greater than about 1 mil in thickness and having a heat-distortion temperature in excess of 200° F., and on one side thereof, an adherent coating of non-rubbery thermoplastic transparent water-insoluble hot-melt-coated adhesive composition consisting of organic components including a film-forming polymeric resin having a softening temperature above 185° F. and an organic component meltable between 125° F. and 185° F., said adhesive composition being further characterized by being nontacky and non-blocking at temperatures up to 125° F. but rapidly developing tack at a temperature between 125° F. and 185° F., the quantity of said adhesive composition being between about 1.5 and 3 pounds per 144 square yards of said backing, the side of said heat-sealable film structure carrying said coating of thermoplastic adhesive composition being disposed toward said paper base sheet, and (2) then passing said structure under mild squeeze pressures rapidly through a field of intense infra-red energy with an infra-red energy absorbing layer in heat-conductive association with the thermoplastic adhesive composition of said heat-sealable film, thereby to generate sufficient heat by absorption of infra-red energy in said infra-red energy absorbing layer to supply by conduction to said thermoplastic adhesive composition sufficient heat to tackify said adhesive composition and bond said heat-sealable film to said paper base sheet.

References Cited

UNITED STATES PATENTS

| | | | |
|---|---|---|---|
| 3,152,950 | 10/1964 | Palmquist et al. | 161—214 |
| 2,961,365 | 11/1960 | Sroog | 161—194 X |
| 2,859,351 | 11/1958 | Clark et al. | 117—36.7 X |
| 2,728,703 | 12/1955 | Kiernon et al. | 161—216 X |
| 2,492,512 | 12/1949 | Zweig | 260—31.6 X |

OTHER REFERENCES

Plasticizers, D. N. Buttrey, 1957, p. 20.

ROBERT F. BURNETT, Primary Examiner

M. A. LITMAN, Assistant Examiner

U.S. Cl. X.R.

96—85; 156—241, 272; 161—167, 231, 250, 406